(12) United States Patent
Axelrod et al.

(10) Patent No.: US 7,730,853 B2
(45) Date of Patent: Jun. 8, 2010

(54) CHEW TOY WITH FABRIC OR FABRIC LAYERING

(75) Inventors: Glen S. Axelrod, Colts Neck, NJ (US); Ajay Gajria, Monmouth Junction, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 237 days.

(21) Appl. No.: 11/933,884

(22) Filed: Nov. 1, 2007

(65) Prior Publication Data
US 2009/0114167 A1 May 7, 2009

(51) Int. Cl.
*A01K 29/00* (2006.01)
(52) U.S. Cl. ...................................... 119/709
(58) Field of Classification Search ............... 119/702, 119/707–711; 473/600–602; 446/486
See application file for complete search history.

(56) References Cited

U.S. PATENT DOCUMENTS

| | | | | |
|---|---|---|---|---|
| 4,019,209 | A * | 4/1977 | Spence | 623/7 |
| 5,026,054 | A * | 6/1991 | Osher et al. | 473/594 |
| 5,413,331 | A * | 5/1995 | Stillinger | 473/599 |
| 6,067,941 | A * | 5/2000 | Axelrod | 119/707 |
| 6,465,073 | B1 | 10/2002 | Morman et al. | |
| 6,805,077 | B2 | 10/2004 | Goldman | |
| 6,918,355 | B1 * | 7/2005 | Arvanites | 119/707 |
| 2002/0073927 | A1 | 6/2002 | Chamberlain | |
| 2005/0053756 | A1 | 3/2005 | Axelrod | |
| 2005/0217603 | A1 * | 10/2005 | Hingst | 119/710 |
| 2006/0216492 | A1 * | 9/2006 | Thomson | 428/304.4 |
| 2008/0026658 | A1 * | 1/2008 | Kriesel | 442/182 |

FOREIGN PATENT DOCUMENTS

JP         54124043 A    *  9/1979

OTHER PUBLICATIONS

International Search Report and Written Opinion dated Dec. 29, 2008 issued in related International Patent Application No. PCT/US08/82214.

* cited by examiner

*Primary Examiner*—Rob Swiatek
*Assistant Examiner*—Kristen C Hayes
(74) *Attorney, Agent, or Firm*—Grossman, Tucker, Perreault & Pfleger, PLLC

(57) ABSTRACT

The present disclosure relates to chew toys comprising a fabric and a polymeric material. The fabric and polymeric material may be present as one or more layers. The chew toys may specifically include a fabric having an outer or exposed surface which may include written/printed indicia. The fabric may be capable of stretching with the polymeric layer and the fabric layer may have an inner surface substantially engaged to the polymeric material. Such engagement may therefore avoid delamination and present a relatively smooth surface without disruptions. Such composite may therefore provide durability and resistance to an animal chewing action.

12 Claims, 4 Drawing Sheets

CHEW TOY WITH FABRIC OR FABRIC LAYERING

FIELD

The present disclosure relates to chew toys comprising a fabric and a polymeric material. More particularly, the present invention relates to pet chews having a fabric outer layer, wherein the outer layer may have a pattern or form of written/printed indicia. The fabric layer may then be backed by a layer of synthetic or natural polymer.

BACKGROUND

Most animals enjoy chewing on things although preferences vary as to the hardness of the substances favored. Some animals may like to chew on very hard materials such as cow bones, wood, nylon or polyurethane, others prefer softer chews such as rawhide, while still others favor freeze dried snacks. Some animals, due to their age, may not be able to chew on the hard substances. Young animals may have insufficiently developed teeth, while old animals may have diseased gums or may have lost some of their teeth.

In addition to the variety of chewing desires and needs of different animals there may also be the consideration that as one lowers the hardness of a material designated for chewing, the strength of a given chewing action may overcome the strength of the material, and the chew may be susceptible to more rapid destruction. In that regard, efforts have been made to provide a chew toy that maintains the interest of an animal in a soft chewing medium, but which soft chew medium maintains itself intact in the chewing environment.

Another consideration in the sales and marketing of chew toys, such as animal chews, may be the ability to attract the animal to play with the chew toy and to attract the owner to purchase the chew toy for the animal. Typically, the chew toy is colored by including pigments in the resin used to manufacturer the toy. It may be advantageous to provide a decorative pattern or message on the outer surface of the chew toy which "catches the eye" of the owner and/or animal. Molding a fabric as the outer layer of such toys may accomplish such a task.

SUMMARY

In a first exemplary embodiment, the present disclosure relates to a chew toy comprising one or more alternating layers of elastomer and fabric, the fabric layer including outer and inner surfaces wherein the fabric includes a first and second plurality of fibers. The fibers may be capable of stretching about 0.1-10% in at least two planes with an angle α between said planes at about 1-179 degrees. An elastomeric layer may be provided having an outer surface, wherein the fabric is engaged to the elastomeric layer and wherein the fabric covers at least a portion of the elastomeric layer and wherein the inner surface of the fabric is engaged along 50-100% of the fabric inner surface to the outer surface of the elastomeric layer. Upon flexing of the toy, the outer fabric layer may stretch and remain engaged to the elastomeric layer.

In a second exemplary embodiment, the present disclosure again relates to a chew toy comprising a fabric layer, including outer and inner surfaces, the fabric comprising a first and second plurality of fibers. The fabric may be capable of stretching at about 0.1-10% in at least two planes with an angle α between said planes at about 1-179 degrees, The elastomeric layer may contain a diene type polymer having an outer surface, wherein the fabric is engaged to the elastomeric layer and wherein the fabric covers at least a portion of the elastomeric layer and wherein the inner surface of the fabric is engaged along 50-100% of said fabric inner surface to the outer surface of the elastomeric layer. Upon flexing of the toy the outer fabric layer may stretch and remain engaged to the elastomeric layer.

In method form, the present disclosure relates to a method of forming a chew toy for an animal, comprising providing a fabric having outer and inner surfaces and providing an elastomeric polymer and/or polymeric precursor, where the polymer and/or polymer precursor may be in liquid form. The fabric may then be placed with its outer surface against a supporting surface followed by distribution of an elastomeric polymer and/or polymeric precursor on to the inner surface of the fabric to form a composite. This may then be followed by rolling of the composite upon itself to form a plurality of layers of alternating fabric and polymer and/or polymeric precursor and then solidifying the polymer and/or polymeric precursor layers to form an elastomeric layer. The inner surface of the fabric may be engaged along 50-100% of the fabric inner surface to the elastomeric layer.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

Figure 1:
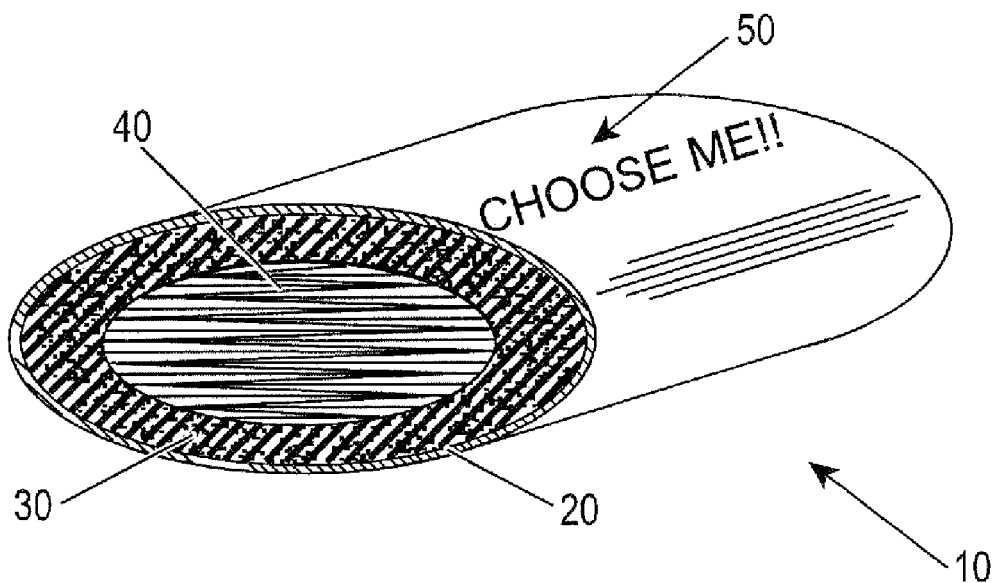
FIG. 1 is a cross-sectional view of an exemplary embodiment of a fabric covered animal chew according to the present invention.

For elements common to the various embodiments of the invention, the numerical reference character between the embodiments is held constant, but distinguished by the addition of an alphanumeric character to the existing numerical reference character. In other words, for example, an element referenced at 10 in the first embodiment is correspondingly referenced 10A, 10B, and so forth in subsequent embodiments. Thus, where an embodiment description uses a reference character to refer to an element, the reference character applies equally, as distinguished by alphanumeric characters, to the other embodiments where the element is common.

The present invention relates to pet chews having a fabric outer layer and a polymeric core. More particularly, the present disclosure relates to pet chews that may comprise a knitted fabric outer layer and a foam core wherein the density of the elastomeric foam may be varied to vary the hardness of the chew toy. The fabric and foam core may be configured to provide overlapping layers of material. In that regard, the pet chew may amount to one or more alternating layers of fabric and foam throughout a given cross-section which may be folded or layered upon themselves. In one embodiment, the layering may occur in a generally spiral configuration. Such folding or layering may therefore provide a relatively strong and durable pet chew along with the ability to include indicia written or printed on the fabric, as may be desired.

In a related embodiment, a relatively low cost material such as folded paper or cardboard may be used within the foam core to also provide a compressible toy.

In a first exemplary embodiment, a fabric having a pattern and/or printed indicia may be placed into a mold and a polymeric material may be applied against the backside of the fabric to form a chew toy for an animal. The fabric may be formed in such a manner as to be stretchable in one or more planes so as to essentially conform to the shape of the inside of the mold due to the presence of the polymeric material. The polymeric material may completely fill the mold cavity when brought into contact with the backside of the fabric, or the polymeric material may comprise a precursor in the form of an expanding mass, such as a foam which may expand to fill the volume of the mold, forcing the fabric into contact with and essentially taking the shape of the mold.

FIG. 1 illustrates an example of one embodiment of the present disclosure in which an animal chew 10 comprises a fabric outer layer 20 and a core portion 30. The fabric may include a pattern and/or printed indicia 50 to distinguish the appearance of the molded chew toy 10. The fabric may provide reinforcement of the core portion against tearing. A relatively lower cost filler material 40, such as paper or cardboard, may be molded within the core portion 30. The relatively lower cost material 40 may be folded in an overlapping or accordion pattern to take up space and to provide a chew toy that may be relatively easily deflected or compressed to add to the chewing experience. However, it should be appreciated that the filler material 40 may not be present in which case the core material (e.g. foam) may comprise the entirety of the region covered by the fabric 20.

While illustrated in FIG. 1 as a somewhat flattened cylindrical shape, the chew toy of the present disclosure may comprise nearly any shape that can be molded, including but not limited to a sphere, animal bone, cylinder, cone, prism, polygon, torus and combinations and portions thereof. In addition, other features including, but not limited to end portions, such as condyles or knuckles, projections from the surface, grooves formed in the surface, etc. may be molded into, or otherwise attached to, the chew toy.

The fabric may comprise a woven, non-woven, or knitted fibrous material and may have a weight per unit area of 0.15 to 15.0 ounces per square yard, including all values and increments therein. That is, the fabric may be formed of any natural or polymeric material that may be fiber forming. By fabric it is intended to mean a sheet structure made from fibers, filaments or yarns. Accordingly, in the broad context of the present invention, the fabric outer layer may include but not be limited to, denim, suede, canvas, burlap, corduroy, linen, jersey, or a tufted material, including carpeting, etc. It is further contemplated that the fabric may be coated with a polymeric material, such as rubber, urethane, etc. to reduce its permeability and provide additional flexibility and toughness.

For relatively complex shapes, the fabric may need to be stretchable to conform to the inner surface of the forming mold and may include a knitted fabric having extensibility in one or two planes. This may allow a fabric having a pattern or printed indicia on an outer surface to be formed into a shape by the polymeric backing material without substantially distorting the appearance of the pattern or print.

Figure 3:
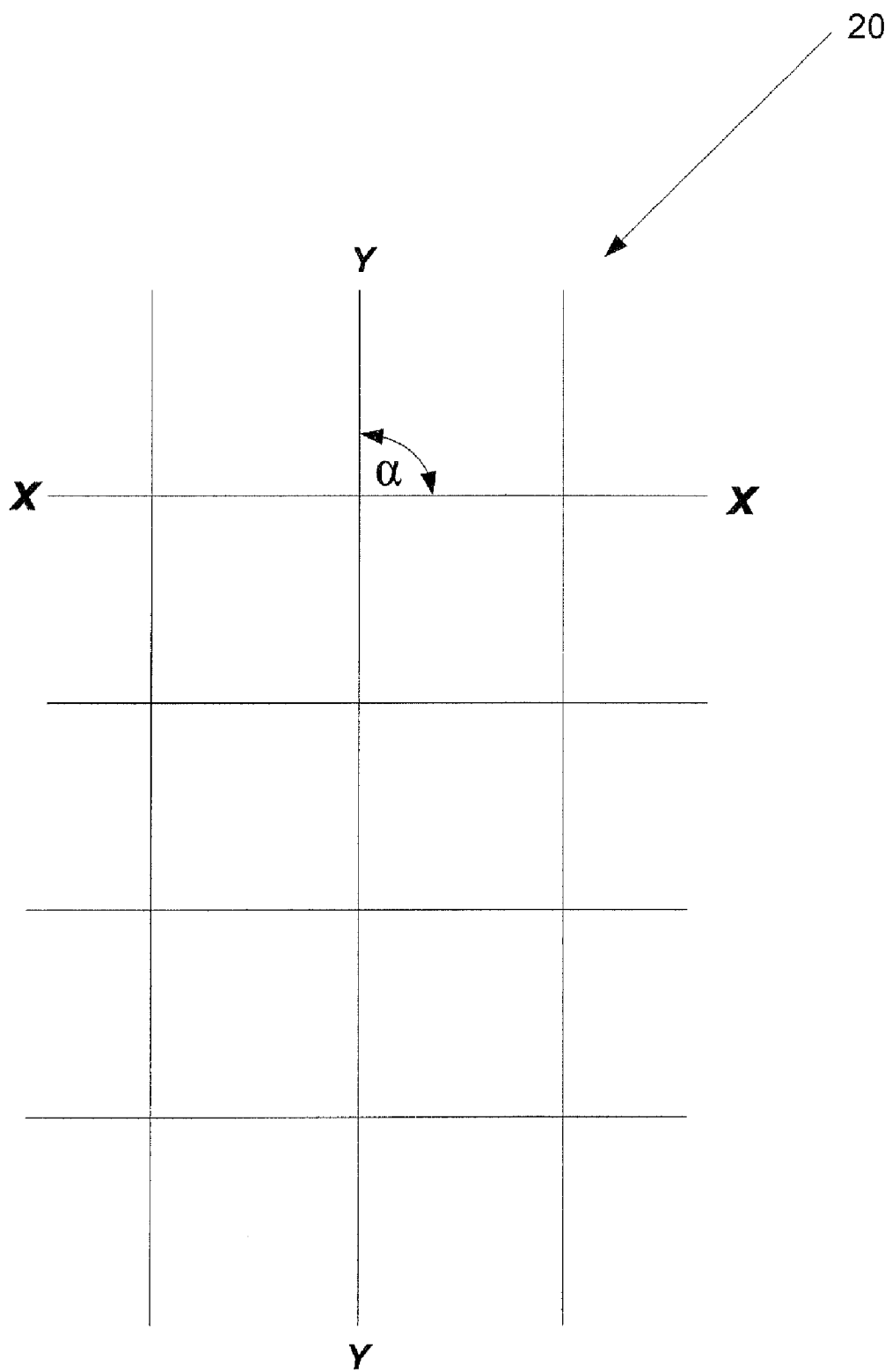
FIG. 3 is a schematic of an enlarged cross-sectional view of the fabric used in the animal chew according to the present invention.

The chew toy may therefore comprise a foam which has been molded behind a knitted fabric having the ability to be easily stretched in an x and/or y plane. Such fabric may, e.g. stretch in a first "x" plane and/or a second "y" plane to a level of about 0.1-10%, including all values and increments therein. It may be appreciated that the x and y planes may intersect one another at a variety of angles α of between about 1-179 degrees, including all values and increments therein. As shown in FIG. 3, a first plurality of fibers "X" may lie in one plane, for instance the x-plane and a second plurality of fibers "Y", may lie at an angle α to the first plurality of fibers. This may allow the fabric to be able to be conformed to the inside of a mold when backed by the molded polymer. Specifically, when the polymer is introduced into the mold, it may form and stretch the fabric against a mold surface. In addition, the ability of the fabric to stretch may allow for the formation of a chew toy which can be flexed. In addition, due to the ability of the fabric to stretch, any indicia on the outer surface of the fabric or pattern in the fabric may be prevented from relatively excessive distortion after molding, such as a distortion due to wrinkling (i.e. overlapping of the fabric on to itself).

The fibers which may comprise the fabric may include, but not be limited to, acrylic fibers, aramid fibers (e.g. Kevlar™), modacrylic fibers, polyamide (nylon) fibers, olefin fibers, polyethylene fibers, extended chain and oriented polyethylene fibers (e.g. Honeywell's Spectra™), naphthalate fibers, polyester fibers (PET), cellulose fibers, cotton fibers or combinations thereof.

The fabric may have a regular or irregular pattern which has been woven or knitted into the fabric or imprinted thereon and/or a combination of colors which may attract a prospective buyer or user. In addition, as alluded to above, the fabric may include indicia in the form of letters, numbers, or symbols that may be placed thereon, by such processes as with silk screening or other printing or coating techniques. Further, trademarks, logos, identification of features, instructions, icons, figures, or other indicia may be included on the surface of the fabric to further distinguish the chew toy. In this regard, in another embodiment, see FIG. 2, the fabric/polymer composite may be rolled up to resemble a newspaper.

The polymeric material which may comprise the core of the chew toy may be any synthetic or natural polymer resin that can be caused to flow and engage with the fabric (mechanically or via adhesion). Accordingly, any thermoplastic resin may be employed, which may include polyolefins, nylons, polyesters, polyacetals, polyurethanes, thermoplastic olefin elastomers, ABS, etc. In addition, certain thermoset formulations may be considered which can be molded onto the fabric, followed by a crosslinking reaction to cause the thermoset network to solidify. Such may include, e.g., polyurethane resins, crosslinked polyesters, and/or epoxy based polymers. Accordingly, the thermoset material may, during curing and crosslinking, become chemically engaged to the fiber material. In curing of the thermoset polymer formulations, chemical bonding may also occur between the resin and the surface functional groups on the fiber material. In addition, the exothermic reaction to form the thermoset may create sufficient heat to melt bond the fabric to the thermoset polymer.

It may therefore be appreciated that in the case of the fabric layer having outer and inner surfaces, the inner surface of the fabric may be engaged to the elastomeric layer along a substantial portion of the fabric inner surface. In such manner, the fabric layer may appear flush to the outer surface of the elastomeric layer and may present a relatively smooth appearance without any disruptions. As may be appreciated, as the composite is intended for use as an animal chew, such substantial engagement of the inner surface of the fabric (e.g. 50-100% of the fabric inner surface) with the elastomeric layer may avoid delamination of the fabric layer as the composite chew toy is flexed during chewing. Such engagement may include all values and increments between 50 and 100% such as 90%, 80%, etc.

In addition, preferably, the polymer material may be an elastomeric material, which is understood herein as a material that is capable of 50% elongation with substantial recovery (50-100%). Preferably, the elastomeric material may be a polyurethane elastomer, natural or synthetic rubber based upon a polydiene type polymer containing the following general repeating unit of carbon atoms $[-C-C=C-C-]_n$ wherein thereby includes cis- and/or trans-1.4-polyisoprene, silicone polymers $(-Si-O-)_n$, and styrene-butadiene type copolymers.

In an exemplary embodiment, a animal bone shaped chew toy, that is, a central shaft having condyles on each end, may be formed by placing a stretchable knitted fabric on to the inside surface of a forming mold having the shape of the chew toy. The fabric may have, e.g. a somewhat irregular pattern and coloring which may, e.g. resemble the skin of a tiger and include a logo or appropriate trademark. The fabric may then be held in place on the surface of the forming mold by static attraction. A microcellular urethane elastomer foam composition may be prepared by mixing precursors and pouring such in the forming mold against the back of the fabric and the mold may then be closed. The foam composition may then be allowed to expand and force the fabric into contact with the inside surface of the forming mold. After curing of the foam, a chew toy having a decorative fabric outer layer may be demolded.

In the case of microcellular elastomeric foam compositions, the hardness of the resulting chew toy may be varied by increasing or decreasing the amount of foam constituents that are placed in the mold, that is, the density of the resulting molded shape. For instance, molded articles may be formed having a relatively soft feel, for instance with a density of the core or foam layer portion (see 30 in FIG. 1) of 5-10 pounds per cubic foot, or having a relatively hard feel, with a density of, for instance, 60-75 pounds per cubic foot. Accordingly, the foam portion for the core portion 30 may be in the range of about 5-100 pounds per cubic foot, including all values and increments therein. Further, the foam composition that may be utilized for the core may be a thermoset (crosslinked) foam and may include greater or lesser amounts of cross-linking agents which may provide a relatively harder or softer foam due to such cross-linking. In either case, the use of urethane or natural rubber elastomers, particularly if expanded into a cellular foam, provides a relatively wide range of hardness and resiliency for a chew toy. Therefore, the hardness of the polymers that may be utilized as the core may have a hardness of a Shore A of about 40 to a Shore D of about 80, including all values and increments therein.

Reference to microcellular may be understood as a foam that may include a plurality of relatively small pores or cells distributed substantially uniformly throughout the molded article. Such pores may have a size of about 25-250 pores per linear inch, and all values and increments therein, including 25-50 pores/linear inch, 100-150 pores/linear inch, 150-200 pores per linear inch, etc.

As alluded to above, the fabric may be adhered to the core by various mechanisms of engagement, as it is contemplated that there can be surface to surface contact between the polymer material of the core and one or more of the fibers, such that the polymer material may adhere (e.g. melt bond) to one or more of the fibers. For example the polymer material of the core, when formed, may be in a liquid state and may contact and adhere to the fibers. In addition, the polymer material of the core may be mechanically engaged with the fibers of the fabric, such as that situation where the polymer material penetrates the fabric to form a mechanical type interaction. It may therefore be appreciated that such interaction of the polymer with the fabric provides that the fabric and polymeric material become advantageously engaged to one another to provide a relatively high strength composite material suitable for chewing upon by an animal. Furthermore, the engagement may be such that the polymer material may surround one or more of the fibers. It should be appreciated therefore that various degrees of engagement may occur along the cross section of any given fabric.

Expanding on the above, the polymeric material may specifically comprise a thermoplastic which may be provided to a mold using any melt processing technique. One skilled in the art would recognize that melt processing may include extrusion, injection molding, compression molding, blow molding, etc. wherein the polymeric material is in a melt or substantially liquid state prior to forming. In one preferred embodiment, the polymeric material may be injection molded behind the fabric. Preferably, the fabric may be placed into the mold cavity and located at any desired position in the mold cavity prior to injecting the thermoplastic melt against the fabric. The polymeric material during molding may then at least partially penetrate the fabric, wherein the polymeric material, upon cooling, engages with the fabric and becomes attached thereto. Accordingly, the attachment may include the polymer material surrounding at least partly, or even completely, various fibers and mechanically interlocking within a given fiber network. Further, the thermoplastic melt may include blowing agents or a gas to provide a foamed thermoplastic core.

It is further contemplated that natural rubber may be used as the polymer wherein the rubber may be provided to the mold in a frothed condition and compression molded to shape.

To provide a relatively lower cost animal chew which may retain compressibility and resiliency, and as noted above, it has been found that a portion of the polymeric core may be replaced with a relatively inexpensive material such as paper or cardboard, as shown in FIG. 1. The paper or cardboard 40 may be folded, in an accordion-like pattern, and heated to help retain the folded shape. The folded paper may be specifically placed into the forming mold and the microcellular composition poured around the folded paper and allowed to expand forcing the fabric 20 into the desired shape 10. Since the viscosity of the expanding mass, or thermoplastic melt, may be relatively high, there may be little penetration of the polymer between layers of the paper, and the paper, due to its folded configuration, may retain some memory and provide a somewhat compressible and resilient property to the core.

Figure 2:
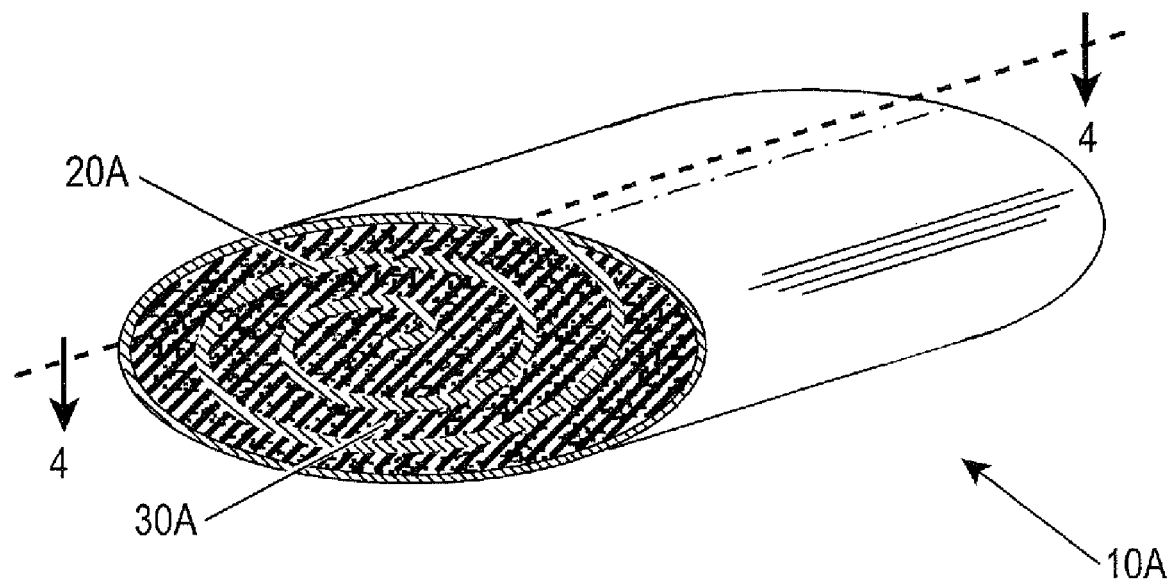
FIG. 2 is a cross-sectional view of another exemplary embodiment of a fabric covered animal chew according to the present invention.

In yet another embodiment, the present disclosure relates to a layered fabric/polymer composite, where there may be a plurality of layers of the fabric/polymer material building to an outer layer of exposed fabric and having the appearance of a rolled up newspaper. As shown in FIG. 2, the composite may include a fabric layer 20 backed by a foam layer 30, wherein this fabric/polymer composite has been layered upon itself in a generally spiral fashion to form a plurality of layers, alternating fabric 20A and foam 30A such that the layers may adhere to one another and form a relatively tough animal chew 10A. The cross-sectional shape may be formed during the layering process to be, for instance, round or flattened, as shown, or any other geometric shape. It is further contemplated that the cross-sectional shape may be formed after the layering process in a mold or by compressing the layered composite.

By alternating layers of fabric and polymer to form a composite, a tough, durable, reinforced structure may be formed, one that may not be easily destroyed by the chewing action of an animal.

Expanding upon the above, it is contemplated that the fabric may be positioned face down with a desired writing on an outer surface, and the inner surface of the fabric treated with a polymer, that is have a polymer in liquid form applied thereto. The interior surface may also be treated with a polymeric precursor (i.e. reactants that may form a polymer) such as a frothed rubber or microcellular foam. The polymer and/or polymeric precursors may, for instance, be poured, extruded, sprayed or distributed in any fashion to relatively uniformly cover the inner surface of the fabric. In one embodiment, the polymer and/or polymeric precursor may be applied to the inner surface of the fabric using a doctor blade. When the polymer and/or polymeric precursor achieves a desired viscosity and/or expansion, the fabric and foam (in the case of expansion) may be rolled up to provide the spiral configuration illustrated in FIG. 2. By controlling the expansion/viscosity of the polymer/polymeric precursors, one may roll the fabric and polymer/foam to provide a desired number of layers. For example, as shown in FIG. 2, there are three (3) layers of foam 30A and three layers of fabric 20A. In the context of the present invention, it is contemplated that one may form between 1-40 layers of fabric with 1-40 layers of elastomer. One may also form 1-40 layers of fabric with 1-40 layers of foam. The 1-40 layers of fabric may also be separated by a combination of foam layers and elastomer layers. In all cases, the reference to 1-40 layers includes all values and increments therein. In addition, the thickness of the foam or elastomer layer may be between 0.0625 inches (1.59 mm) to 2.0 inch (50.8 mm).

Figure 4:
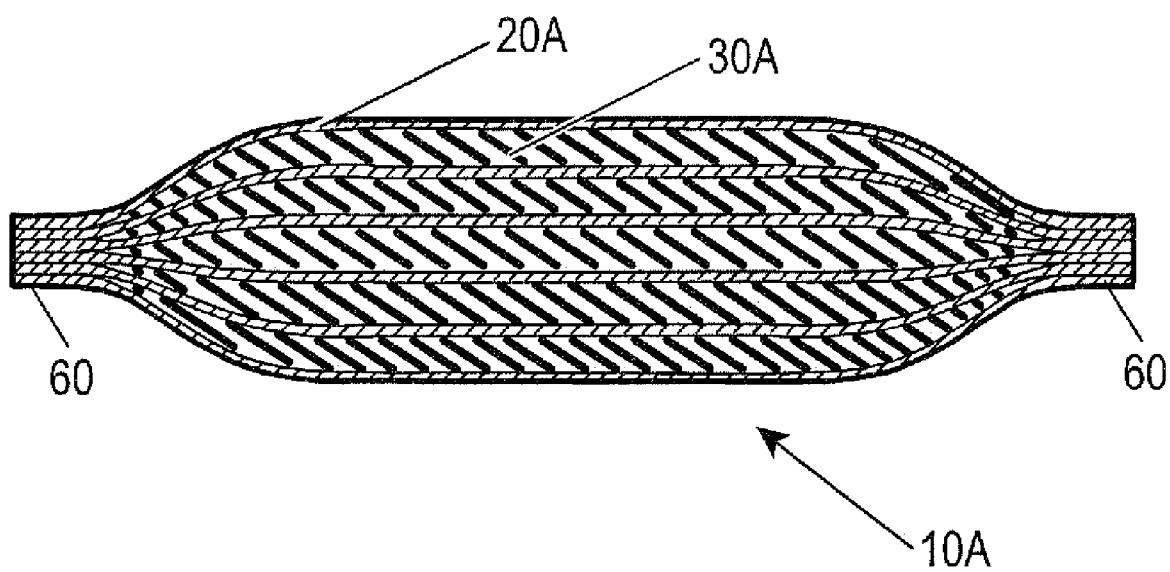
FIG. 4 is a lengthwise cross-sectional view of FIG. 3 illustrating an end treatment for the chew.

One may compress the end sections of the composite down to the point where there is little or no foam material between the layers of fabric, such that the end sections provide the configuration shown generally at 60 in FIG. 4. As may be appreciated, in such fashion, the ends of the composite may include multiple layers of fabric with a relatively small amount of elastomer and/or foam between such fabric layers. On the other hand, the mid-section of the composite may have the foam/fabric layering as noted above. For example, once again, the foam may have a thickness of between about 0.0625 inches (1.59 mm) to about 2.0 inch (50.8 mm) in the center of the composite 10A and taper towards the ends. At the end sections, the foam may simply be present in an amount sufficient to provide adhesion between the layers of fabric material 20A.

Figure 5:
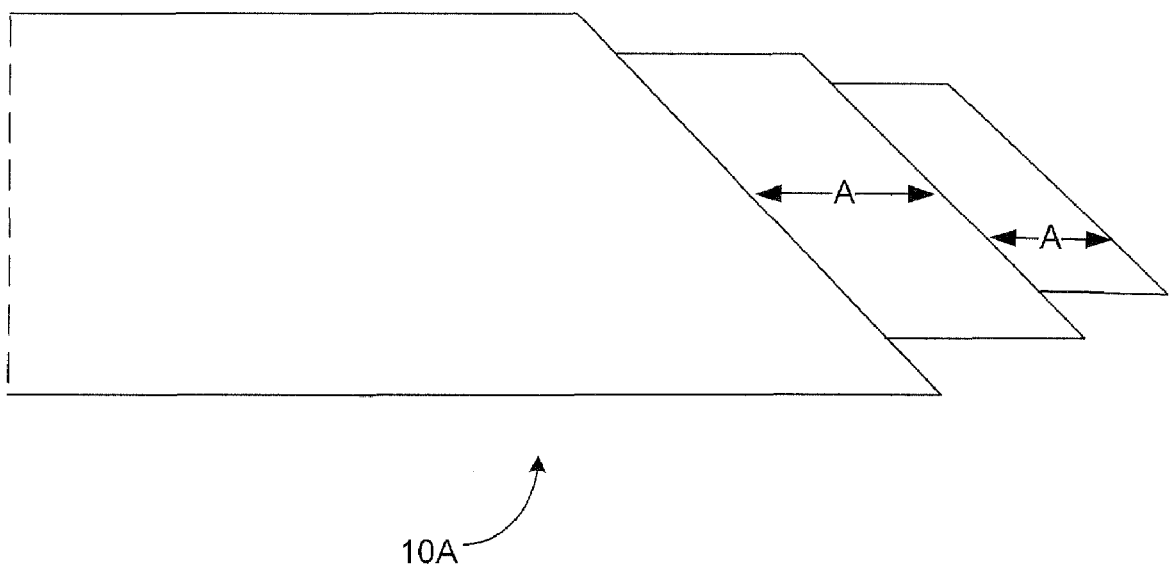
FIG. 5 is a partial perspective view of a rolled composite according to the present disclosure.

In addition, once a particular number of layers of foam and fabric are developed, one may compress the composite of foam and fabric with heat and pressure to shape the composite prior to that point in time where the polymer has solidified or gelled. In addition, the ends of the rolled composite may be left exposed, preferably in overlying leaf fashion as in a rolled-up newspaper, as illustrated in FIG. 5. For example, the fabric layer of one spiral portion may extend from about 0.125 inches to about 0.75 inches from the end of the fabric layer of a preceding spiral portion, including all values and increments therein. This extension is shown generally by arrows A in FIG. 5. Accordingly, the distance defined by arrow A may be between 0.125 inches and 0.75 inches, as illustrated.

It is further contemplated that alternating layers of fabric and polymer may be laid upon one another in laminate form and not in spiral fashion to form a fabric reinforced animal chew.

In any of the embodiments disclosed herein, it may be appreciated that attractants, such as flavorants or scents, may be added to the composition to interest the animal in chewing on the chew toy. Such attractants may be added to either the fabric or core (polymer) material, and may be used at concentrations of about 0.1-5% by weight, including all values and increments therein.

The present invention has been set forth in reference to specific exemplary embodiments, but it should be understood by those skilled in the art that such exemplary embodiments are by way of illustration only. Modifications and variations will therefore be apparent and may be resorted to without departing from the spirit and equivalent scope of this invention. Accordingly, such modifications and equivalents should be considered to be within the purview of the scope of the invention as set forth in the appended claims.

What is claimed is:

1. A chew toy comprising:
    alternating layers of elastomer and fabric providing a plurality of layers of elastomer and fabric that overlap in a spiral configuration, said fabric layer including outer and inner surfaces, said fabric comprising a first and second plurality of fibers;
    said fabric capable of stretching at about 0.1-10% in at least two planes with an angle α between said planes at about 1-179 degrees,
    said elastomeric layer having an outer surface, wherein said fabric layer is melt bonded or mechanically engaged or chemically engaged with said elastomeric layer and wherein said fabric covers at least a portion of said elastomeric layer and wherein said inner surface of said fabric is engaged along 50-100% of said fabric inner surface to said outer surface of said elastomeric layer and wherein upon flexing of said toy, said outer fabric layer stretches and remains engaged to said elastomeric layer.

2. The chew toy of claim 1 wherein said fabric has a weight per unit area of 0.15-15 ounces per square yard.

3. The chew toy of claim 1 wherein said fabric comprises a woven, a non-woven or a knit.

4. The chew toy of claim 1 wherein said elastomeric layer is capable of 50% elongation with recovery of 50-100%.

5. The chew toy of claim 1 wherein said elastomeric layer is a foam and has a density of 5-100 pounds per cubic foot.

6. The chew toy of claim 5 wherein said elastomeric foam has 25-250 pores per linear inch.

7. The chew toy of claim 5 comprising 1-40 layers of fabric and 1-40 layers of foam.

8. The chew toy of claim 1 wherein said elastomeric material penetrates said fabric.

9. The chew toy of claim 1 wherein at least one of said fabric layer or said elastomeric layer includes an attractant wherein said attractant is present at a level of about 0.1-5.0% by weight.

10. The chew toy of claim 1 wherein said elastomeric layer comprises cis- and/or trans-1,4-polyisoprene.

11. The chew toy of claim 1 wherein said inner surface of said fabric is engaged along 90-100% of said fabric inner surface to said outer surface of said elastomeric layer.

12. A chew toy comprising:
    a fabric layer, including outer and inner surfaces, said fabric comprising a first and second plurality of fibers;
    said fabric capable of stretching at about 0.1-10% in at least two planes with an angle α between said planes at about 1-179 degrees,
    an elastomeric layer comprising a diene polymer having an outer surface, wherein said fabric layer is melt bonded or mechanically engaged or chemically engaged with said elastomeric layer and wherein said fabric covers at least a portion of said elastomeric layer and wherein said inner surface of said fabric is engaged along 50-100% of said fabric inner surface to said outer surface of said elastomeric layer and wherein upon flexing of said toy, said outer fabric layer stretches and remains engaged to said elastomeric layer, wherein said fabric layer and elastomeric layer are present as a plurality of layer in said chew toy and overlap one another in a spiral configuration.

* * * * *